United States Patent [19]

Krikor

[11] Patent Number: 4,467,469
[45] Date of Patent: Aug. 21, 1984

[54] CIRCUITRY FOR RECOVERY OF DATA FROM CERTAIN BIT POSITIONS OF A T1 SPAN

[75] Inventor: Krikor A. Krikor, Glendale, Ariz.

[73] Assignee: GTE Automatic Electric Inc., Northlake, Ill.

[21] Appl. No.: 435,196

[22] Filed: Oct. 19, 1982

[51] Int. Cl.³ .............................................. H04J 3/06
[52] U.S. Cl. .................................... 370/58; 370/99; 370/100; 370/110.1
[58] Field of Search ................. 370/58, 77, 99, 100, 370/110.1, 111

[56] References Cited

U.S. PATENT DOCUMENTS

| | | | |
|---|---|---|---|
| 3,542,957 | 10/1968 | Mitchell et al. | 370/111 |
| 4,151,373 | 4/1979 | Widmer et al. | 370/111 |
| 4,191,857 | 3/1980 | McLaughlin et al. | 370/110.1 |
| 4,268,722 | 5/1981 | Little et al. | 370/110.1 |
| 4,314,368 | 2/1982 | Decoursey et al. | 370/110.1 |

Primary Examiner—Douglas W. Olms
Assistant Examiner—Kenneth I. Rokoff
Attorney, Agent, or Firm—Frank J. Bogacz; Peter Xiarhos

[57] ABSTRACT

This circuit provides for retrieving common control interoffice signaling (CCIS) data from a PCM voice data stream of a T1 span. T1 spans interconnect switching offices. Unused data bits in these T1 spans are encoded with CCIS data and transmitted between the switching systems where the CCIS data is recovered.

8 Claims, 3 Drawing Figures

CIRCUITRY FOR RECOVERY OF DATA FROM CERTAIN BIT POSITIONS OF A T1 SPAN

BACKGROUND OF THE INVENTION

The present invention pertains to serial data link transmission techniques between digital switching systems and more particularly to circuitry for recovery of data from unused bit positions of a T1 span.

Digital trunk units perform interface functions between T1 spans and the central processing unit (CPU) of a digital telephone switching system.

Certain bit positions in a T1 span are unused. These bit positions may be used to transmit other data. The problem is to recover this data from the unused bit position synchronously with the flow of the PCM data of a T1 span. A terminal equipment control circuit provides for detecting this data and retransmitting it to the switching system's CPU.

The terminal equipment control circuit must be synchronized with the particular T1 span from which it is receiving data. A digital trunk unit operates a number of T1 spans. Therefore, the terminal equipment control circuit of a common channel interoffice signaling (CCIS) system must be capable of synchronizing with a number of different T1 spans. If each T1 span generates its transmit and receive clocks, there will be a large number of clock circuits and connections required, one for each T1 span, to maintain synchronism between the digital trunk unit and the terminal equipment control circuit.

In order to accurately retrieve the CCIS data from the unused bit positions of the incoming T1 spans, a detection and synchronization scheme is required. Accordingly, it is the object of the present invention to provide for synchronously detecting CCIS data in unused bit positions of a number of T1 spans while minimizing the number of synchronization clock sources.

SUMMARY OF THE INVENTION

A digital switching system is operated by a central processing unit. This switching system operates to transfer voice data of T1 spans via the switching system.

Certain bit positions within the T1 span frame are unused. Therefore, CCIS data may be transmitted via the switching system in these unused bit positions. Accordingly, the circuitry for recovering the CCIS data from any one of a number of T1 spans is provided.

This circuitry includes a digital switching network with a master clock which provides a fixed frequency for operating the switching network. A CCIS clock circuit is connected to the switching network's master clock and the CCIS clock operates to count down the master clock frequency to another frequency for use in detecting the CCIS data. A digital trunk unit is connected between a number of T1 spans and the switching network. The digital trunk unit transfers PCM voice data from the T1 spans to the switching network. In addition, the digital trunk unit removes a synchronization/framing (S/F) bit from each T1 frame.

Converting apparatus is connected to the digital trunk unit and the CCIS clock. The converting apparatus receives these S/F bits and accumulates a fixed number of them for subsequent periodic examination. At each particular time interval, eight values of the S/F bit are collected, one from each of eight consecutive T1 span frames. Four of these bits in alternate positions are synchronization, S bits. The other four alternate bits are framing, F bits.

Comparing apparatus is provided for examining the values of the F bits at each time interval period. Four other bit values are input to the comparator apparatus for reference comparison and include two connections to the logic voltage source and two connections to electrical ground. These connections are organized to form a particular binary pattern. The comparing apparatus then tests the F bits input to it in each particular time interval with the reference bit values which are hard wired. A signal indicating equality is produced by the comparing apparatus upon detection of a bit for bit match. When this condition is achieved, it is known that the least recent S bit received by the converting apparatus contains the CCIS data to be retrieved. This data is then in suitable form to be transmitted to the CPU.

DESCRIPTION OF THE PREFERRED EMBODIMENT

Figure 1:
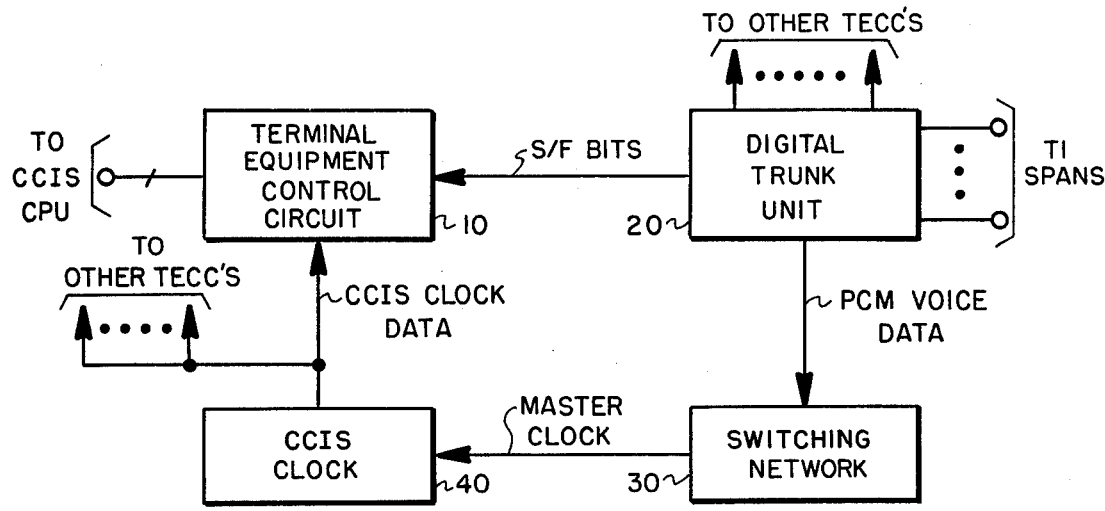
FIG. 1 is a block diagram of a portion of a digital switching system for recovering data from incoming T1 spans.

Referring to FIG. 1, a number of incoming T1 spans are shown connected to a digital trunk unit 20. A terminal equipment control circuit (TECC) 10 is connected between a CCIS central processing unit (CPU) and digital trunk unit (DTU) 20. Digital trunk unit 20 is also connected to a switching network 30. PCM voice data is transmitted from the digital trunk unit 20 to the switching network 30. Switching network 30 is further connected to CCIS clock 40 via a master clock lead. A master clock signal, transmitted via this lead, provides for synchronization and clocking to operate the switching network 30. The master clock signal is transmitted to CCIS clock 40 via the master clock lead. The frequency of this signal is 12.352 MHZ. There is an absence of a pulse in this master clock signal, at a frequency of 8 KHZ.

CCIS clock 40 is connected to TECC 10. CCIS clock 40 operates in response to the master clock signal to detect the 8 KHZ absent pulse. As a result, clock 40 generates an 8 KHZ CCIS data clock signal which is synchronized to the absent pulse.

Figure 2:
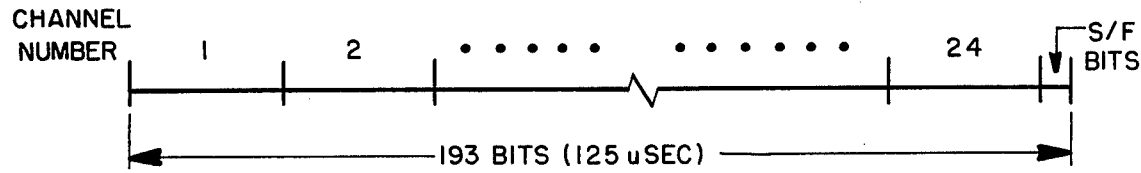
FIG. 2 is a diagram of a sample T1 frame layout.

The absent pulse is a synchronization/framing (S/F) bit of a T1 frame, see FIG. 2. As shown in FIG. 2, the T1 frame is 193 bits in length or 125 microseconds in duration. Twenty-four channels of 8 bits each are included in one T1 frame. The 193rd bit of each T1 frame is the S/F bit. This bit position is alternately a synchronization and a framing bit.

Since modern T1 carrier equipment does not use the synchronization bit, CCIS data may be transmitted in this bit position between digital switching systems. This synchronized 8 KHZ CCIS clock signal is transmitted from clock 40 to a number of TECCs (not shown). In addition, the DTU 20 may be connected to a number of TECCs, each TECC handling a different incoming T1 span.

The DTU 20 removes the PCM voice data from a particular T1 span and transfers this data to switching network 30. The S/F bits are transmitted to TECC 10 for analysis. Since the switching network clock operates the switching network and DTU and additionally the CCIS data clock is derived from it, the TECC, DTU and switching network will be operating synchronously with respect to a particular T1 span.

Since the S and F bits alternately appear in the T1 frames, a method of distinguishing them is employed by the TECC. The synchronous 8 KHZ CCIS data clock which was derived by CCIS clock 40 as a result of counting down master clock signal provides for gating the S/F bits into a converting apparatus. The converting apparatus collects eight values of the S/F bit. These bits are collected and ordered for subsequent examination. Four of the bits in alternate positions are S bits and the other four alternate positions are F bits. The F bits are then compared against a fixed pattern of binary value "1010". If a match of the F bits is detected, the least recent S bit received is CCIS data.

Figure 3:
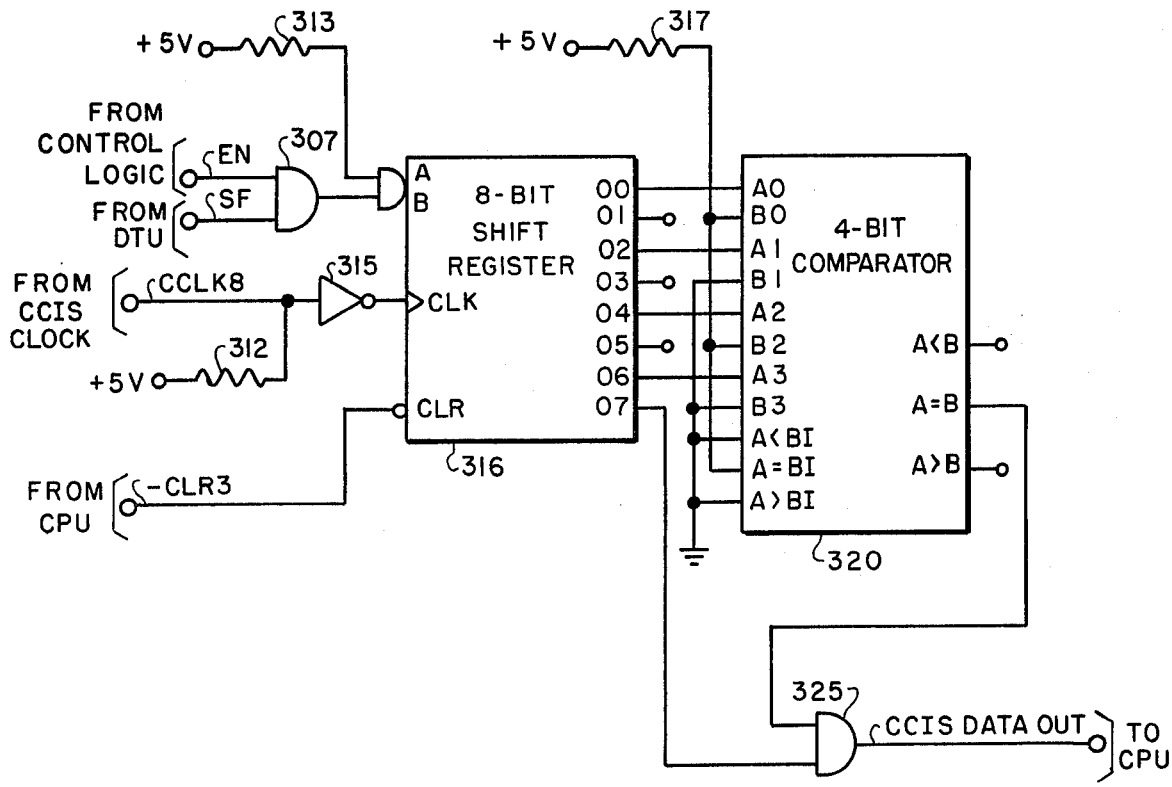
FIG. 3 is a schematic diagram of the terminal equipment control circuitry shown in FIG. 1.

FIG. 3 depicts the converting and comparing apparatus of the terminal equipment control circuit 10, as shown in FIG. 1. The S/F bits are transmitted via the S/F lead shown connected from the DTU 20 of FIG. 1 to AND gate 307. An enabling signal is provided to AND gate 307 via control logic (not shown) under control of the CCIS CPU.

Gate 307 is connected to 8-bit shift register 316 and provides for applying the S/F bits serially to shift register 316. Inverter 315 is connected to a clock input of shift register 316. The synchronized 8 KHZ clock signal, derived via the CCIS clock 40 of FIG. 1, is transmitted through inverter 315 via the CCLK8 lead to shift register 316. This 8 KHZ signals provides for shifting each incoming S/F bit into a parallel format for subsequent examination. Shift register 316 provides for aligning the values of these eight parallel bit positions as outputs 00 through 07. Beginning with output 00, each alternate bit position is connected via a corresponding lead to 4-bit comparator 320. These four bits represent one of the inputs which the comparator 320 is to examine.

The values of the second 4-bit input, which are to be examined by comparator 320, are constructed as follows. A source of +5 volts or logic "1" is connected to comparator 320 in alternate bit positions beginning with the first bit position. Electrical ground or logic "0" is connected to comparator 320 in alternate bit positions beginning with the second bit position. As a result, the binary sequence "1010" is input to comparator 320 as a reference. Comparator 320 matches bit for bit the values of the first sequence of four bits input from shift register 316, with the values of the second sequence of bits input in the hard wired form.

Comparator 320 produces an output if the values of the first sequence of bits is equal to the values of the second sequence of bits. This signal is transmitted to AND gate 325 via a lead connecting gate 325 to comparator 320. When the framing bits have the value of "1010", the least recently received S bit, which resides in bit position 07 of shift register 316, contains CCIS data. Bit position 07 of shift register 316 is connected to AND gate 325. The enabling signal, generated by the equality of the F bits with the hard wired bit pattern, allows AND gate 325 to transmit the CCIS data bit to CPU via the CCIS data out lead. The CPU will receive the CCIS data at a rate of 4K bits per second.

As mentioned above a number of terminal equipment control circuits TECCs 10 as shown in FIG. 1, may simultaneously be recovering CCIS data and retransmitting it to the CPU.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a digital switching system having a CPU and a plurality of T1 spans, voice data of said T1 spans being switched by said system, circuitry for recovering CCIS data from any of said plurality of T1 spans, said circuitry comprising:
    a digital switching network including a master clock providing a first signal of a first frequency;
    a CCIS clock connected to said digital switching network and said master clock, said CCIS clock being operated in response to said first signal to produce a second signal of a second frequency;
    a digital trunk unit connected between said plurality of T1 spans and said switching network, said digital trunk unit operated to transfer said voice data of said T1 spans to said digital switching network;
    said digital trunk unit further operated to transmit a third signal at a particular frequency;
    means for converting connected to said digital trunk unit and to said CCIS clock, said means for converting operated in response to said third signal and said second signal to produce a fourth signal at periodic time intervals;
    said fourth signal of any of said time intervals being values for a first sequence of particular bit positions of one said T1 span;
    means for setting predetermined values for a second sequence of bit positions; and
    means for comparing connected to said means for converting and to said means for setting, said means for comparing operated in response to said first and said second sequences of bit positions to produce a fifth signal of a first value for equality of said values of said first and second sequences of bit positions for indicating the detection of a CCIS data bit or alternatively to produce said fifth signal of a second value for inequality of said values of said first and second sequences of bit positions.

2. Circuitry as claimed in claim 1, wherein there is further included gating means connected to said means for converting and to said means for comparing and said gating means operated in response to said fifth signal of said first value to transmit said indicated CCIS data to said CPU.

3. Circuitry as claimed in claim 2, said means for converting including:
    a serial to parallel shift register;
    a first gate connected to said shift register;
    a first connection from said digital trunk unit to said first gate for transmitting a particular frequency of bit position values to said shift register via said first gate;
    a second connection from said CCIS clock to said shift register for synchronizing said third signal for conversion to said fourth signal; and
    a plurality of third connections to said means for comparing for transmitting said values of first sequence of bit positions to said means for comparing.

4. Circuitry as claimed in claim 3, said means for setting including:
    a voltage source;

a first plurality of connections to electrical ground;

a second plurality of connections to said voltage source; and said first and second pluralities of connections ordered to form said second sequence of bit positions having a binary value of 1010.

5. Circuitry as claimed in claim 4, said means for comparing including:

a comparator connected to said shift register via said plurality of third connections;

said comparator further connected to said means for setting via said first and second pluralities of connections to said voltage source and said electrical ground; and said comparator operated to detect equality of said values of said first and second sequences of said bit positions.

6. Circuitry as claimed in claim 5, wherein there is further included a connection from said gating means to said shift register for transmitting said CCIS data bit.

7. Circuitry as claimed in claim 5, wherein there is further included a connection from said gating means to said comparator for transmitting said fifth signal.

8. Circuitry as claimed in claim 5, wherein there is further included a connection from said gating means to said CPU for transmitting said CCIS data to said CPU.

* * * * *